3,457,168
PROCEDURE FOR DISPOSING OF PETROLEUM
OIL ON A WATER SURFACE
Earl W. Malmberg, Wilmington, Del., and William M. Robinson, West Chester, Pa., assignors to Sun Oil Company, Philadelphia, Pa., a corporation of New Jersey
No Drawing. Filed Mar. 8, 1968, Ser. No. 711,511
Int. Cl. B01d 11/04
U.S. Cl. 210—21                        3 Claims

ABSTRACT OF THE DISCLOSURE

A method of dispersing a petroleum oil layer from the surface of a body of open water comprising coating the exposed surface of the oil with a layer of foamed surfactant and subsequently vigorously agitating the water-oil-surfactant layers after the foamed surfactant has become substantially digested by the oil layer.

BACKGROUND OF THE INVENTION

The detrimental effects of contamination of the oceans as well as inland waterways with large quantities of petroleum oil which float on the surface of the open water have recently become a serious problem. One cause of the recent increase in contamination is said to be the result of increased shipments of crude oil by means of ocean-going tankers. Often, large quantities of oil from these tankers are either accidentally spilled into the water or are purposely placed there when the storage tanks of the ship are cleaned. Sometimes large quantities of crude oil contaminate the oceans as the result of ships foundering and breaking up on the coastal shores. Once the oil spill is on the surface of the water, it is usually carried by tides and currents to adjacent land where it is deposited as a slick, and slippery surface coating which usually renders that land unsuitable for living plants or animals. No suitable method of overcoming this problem has yet been found.

One of the many approaches to this problem that has been disclosed in the literature is the application of various surfactants to the open surface of the oil spill with the hope that sufficient dispersion of the oil could be obtained. Unfortunately, most of the current knowledge in the art of petroleum emulsification is not applicable to circumstances where oil is spilled on open water. Many of the conveniently available surfactants are usually more water soluble than oil soluble and normally of a higher density than oil or water. The high density of these surfactants, combined with their hydrophilic nature, results in the surfactant normally sinking below the oil-water interface without providing the desired interaction to promote dispersion of the oil. Thus, the use of surfactants in their natural or prepared form has been found to be ineffective as a means of dispersing petroleum oil from the surface of open water.

BRIEF SUMMARY OF THE INVENTION

We have now discovered a method whereby surfactants can be processed to provide a surfactant composition suitable for use in dispersing oil spills on open water.

We have now discovered that by vigorously agitating a liquid surfactant, a foamed surfactant composition can be produced. This surfactant foam can be spread over the surface of oil spills on open water to provide for sufficient contact between the oil and the surfactant to ultimately result in adequate dispersion of the oil spill in the open water.

DESCRIPTION OF THE INVENTION

Specifically it has been discovered that a process comprising (a) covering an oil spill on open water with a thin layer of foamed surfactant, (b) permitting sufficient time for the foamed surfactant to be digested by the oil, and (c) agitating the oil vigorously to provide a dispersion of the oil in the water.

By the term digested, as herein disclosed, is meant an intricate dispersion and partial absorption of the foamed surfactant into the oil layer. It is conceived that by applying the surfactant in the foamed state, the surfactant is physically inhibited from quickly passing through the oil layer into the water below. This slowing-down of the surfactant as it passes into the oil layer, provides a longer period of intimate contact between the oil and surfactant thereby resulting in higher dissolution of the surfactant in the oil. Once the surfactant has sufficiently dissolved in the oil (digested), the entire composition can be agitated to provide adequate dispersion of the oil in the water layer.

The period of digestion can be adjusted according to the circumstances at hand. These circumstances include air temperature, water temperature, and state of the body of water (calm or turbulent, etc.). Normally, 1 to 60 minutes is a suitable time period for digestion. Agitation of the oil and foamed surfactant blend on the water can be accomplished with any suitable means of agitating large volumes of liquid. The propellers of boats or outboard motors are one example of means of agitating the oil-foamed surfactant blend.

Surface active agents are suitable as a class for use according to the present invention. The nature of surface active agents is well known, and such agents generally have an oleophilic portion of the molecule, usually of hydrocarbon nature, and another, polar portion of the molecule, which may be provided by various functional groups such as hydroxyl, sulfate, carboxy, carbonyl, amino, nitro, amido, ether, sulfonate, phosphate, phosphite, etc. Examples of suitable classes of surface active agents which can be employed are: alkali metal salts of fatty acids, alkali metal salts of sulfated fatty acids, fatty acid glycerides, sulfonated or sulfated fatty acid esters or amides, alkali metal alkyl sulfates, alkali metal alkyl sulfonates, alkali metal aryl sulfonates, alkali metal alkyl-lauryl sulfonates, quaternary ammonium halides, alkali metal salts of alkylated naphthalene, sulfonic acid, polyethylene sorbitol esters of fatty acids, fatty acid amides or alkanol amines, condensation products of ethylene oxide and polyalkylene glycols, sorbitan esters, alkyl substituted phosphoric acids, alkali metal salts of alkyl phenol sulfonates, etc. Examples of individual surface active agent which can be employed are given, for example in Kirk et al., Encyclopedia of Chemical Technology, vol. 13 pp. 515–517 (1954).

Particularly suitable surface active agents for use according to the invention are the polyalkyl amines, fatty acid amides, and the polyethylene sorbitol ester of fatty acids, of which numerous examples are given in the Kirk et al. disclosure referred to in the preceding paragraph.

Surface active agents are found in both liquid and solid forms. In the case where the surfactant to be used is in the solid form, it should first be dissolved in a small quantity of a suitable solvent to provide a thick viscous liquid. The surfactant in this form is then suitable for foaming.

As an illustration of one embodiment of the method of the present invention, the following examples are given:

Example I

One liter of petroleum crude oil was spilled on the surface of an open body of water. Thereafter, one hundred milliliters of a non-ionic surfactant which is the condensate product of coconut oil and diethanolamine were sprayed onto the surface of the oil spill. After 30 minutes from the time the surfactant was sprayed onto the oil surface, the area of water containing the oil spill was vigorously agitated for 15 minutes.

Observation of the oil spill after this treatment revealed only partial dispersion of the oil with a significant amount of oil remaining on the surface of the water. The result of this attempt to disperse the oil spill is considered poor and the method was considered to be ineffective.

Example II

Example I was repeated with the exception that 100 milliliters of surfactant were vigorously agitated in a Waring Blendor for 30 minutes to provide a large volume of foam which was sufficient to cover the entire surface of the oil spill. The foam was spread over the surface of the oil spill and was permitted to remain that way for 30 minutes. After this period, which is herein referred to as the period of digestion, the entire area of water-oil and foam was agitated vigorously for 15 minutes. At the end of this time, the area was permitted to settle. Observation revealed no oil pools remaining on the surface of the water indicating that the oil spill had been completely dispersed.

Surfactants other than those specified in the specific embodiments disclosed above can be used in the method of the present invention with substantially equivalent results being obtained. Other cationic, non-ionic and anionic surfactants can be substituted for the surfactants given in the working examples with substantially analogous results being obtained.

We claim:

1. A method of dispersing oil spills from the surface of open water which comprises
    (a) preparing a foam composition from a liquid surfactant composition,
    (b) covering the surface of the oil spill with the foam composition,
    (c) permitting the foam and oil sufficient contact time for the oil to digest the foam, and
    (d) agitating the foam-oil-water area for the time necessary to completely disperse the oil from the surface of the water.

2. A method according to claim 1 wherein the oil-foam contact time is in the range of 1 to 60 minutes.

3. A method according to claim 1 wherein the surfactant is a non-ionic composition.

References Cited

UNITED STATES PATENTS

| | | | |
|---|---|---|---|
| 2,447,551 | 8/1948 | Zisman et al. | 252—1 |
| 2,487,964 | 11/1949 | Cranston. | |
| 2,996,119 | 8/1961 | Kimber et al. | |
| 3,198,731 | 8/1965 | De Lew | 210—42 |

FOREIGN PATENTS

| | | |
|---|---|---|
| 1,069,024 | 11/1959 | Germany. |

MICHAEL E. ROGERS, Primary Examiner

U.S. Cl. X.R.

252—1